United States Patent
Bauer et al.

(10) Patent No.: US 10,865,695 B2
(45) Date of Patent: Dec. 15, 2020

(54) MOTOR VEHICLE

(71) Applicant: Mahle International GmbH, Stuttgart (DE)

(72) Inventors: Swen-Juri Bauer, Stuttgart (DE); Michael Baumann, Ammerbuch (DE); Andreas Gruener, Hattenhofen (DE); Andrea Teubner, Rainau-Schwabsberg (DE)

(73) Assignee: Mahle International GmbH

( * ) Notice: Subject to any disclaimer, the term of this patent is extended or adjusted under 35 U.S.C. 154(b) by 0 days.

(21) Appl. No.: 16/349,598

(22) PCT Filed: Oct. 23, 2017

(86) PCT No.: PCT/EP2017/077012
§ 371 (c)(1),
(2) Date: May 13, 2019

(87) PCT Pub. No.: WO2018/086851
PCT Pub. Date: May 17, 2018

(65) Prior Publication Data
US 2019/0345867 A1  Nov. 14, 2019

(30) Foreign Application Priority Data

Nov. 14, 2016  (DE) .......................... 10 2016 222 307
Jan. 19, 2017   (DE) .......................... 10 2017 200 878

(51) Int. Cl.
*F01P 5/10*   (2006.01)
*F01P 7/16*   (2006.01)
(Continued)

(52) U.S. Cl.
CPC .................. *F01P 7/16* (2013.01); *F01P 5/10* (2013.01); *F01P 5/12* (2013.01); *F01P 7/14* (2013.01);
(Continued)

(58) Field of Classification Search
CPC ...... F01P 7/16; F01P 7/161; F01P 5/10; F01P 7/164; F01P 5/12; F01P 7/14; F01P 11/16;
(Continued)

(56) References Cited

U.S. PATENT DOCUMENTS 4,546,786 A   10/1985  Koike
4,748,941 A * 6/1988  Kashiwase ................ F01P 7/16
                                                      123/41.1
(Continued)

FOREIGN PATENT DOCUMENTS

DE   33 09 435 A1   10/1983
DE   34 35 833 A1    4/1986
(Continued)

OTHER PUBLICATIONS

English abstract for DE-34 35 833.
(Continued)

*Primary Examiner* — George C Jin
*Assistant Examiner* — Teuta B Holbrook
(74) *Attorney, Agent, or Firm* — Fishman Stewart PLLC

(57) ABSTRACT

A motor vehicle may include an internal combustion engine, a radiator, a heat exchanger, a coolant pump, and a valve device arranged separately therefrom, which is controlled at an intake side by pressure. The valve device may include at least one first coolant inlet, at least one second coolant inlet, and a coolant outlet connected to an inlet of the coolant pump. The valve device may be configured to, based on a selected operating point of the coolant pump and a pressure in a coolant, at least one of open and close at least one of the at least one first coolant inlet and the at least one second coolant inlet. The at least one first coolant inlet and a coolant outlet of the coolant pump may be connected to the internal
(Continued)

combustion engine, and the at least one second coolant inlet may be connected to the radiator.

20 Claims, 4 Drawing Sheets

(51) Int. Cl.
*F01P 5/12* (2006.01)
*F01P 7/14* (2006.01)
*F04D 15/00* (2006.01)
*F16K 31/122* (2006.01)
*F01P 11/16* (2006.01)

(52) U.S. Cl.
CPC ............... *F01P 7/161* (2013.01); *F01P 7/164* (2013.01); *F04D 15/00* (2013.01); *F04D 15/0016* (2013.01); *F04D 15/0022* (2013.01); *F16K 31/1221* (2013.01); *F01P 7/162* (2013.01); *F01P 11/16* (2013.01); *F01P 2005/125* (2013.01); *F01P 2007/146* (2013.01); *F01P 2025/50* (2013.01)

(58) Field of Classification Search
CPC .. F01P 2025/50; F01P 2005/125; F01P 7/162; F01P 2007/146; F01P 7/165; F04D 15/0016; F04D 15/0022; F04D 15/00; F16K 31/1221; F02M 26/28; F02M 26/30
See application file for complete search history.

(56) References Cited

U.S. PATENT DOCUMENTS

| | | | | |
|---|---|---|---|---|
| 5,121,714 A * | 6/1992 | Susa | ............... | F01P 7/165 123/41.1 |
| 5,494,005 A * | 2/1996 | Saur | ............... | G05D 23/1333 123/41.1 |
| 5,529,025 A * | 6/1996 | Ranzinger | ............... | F01P 7/167 123/41.1 |
| 5,787,845 A * | 8/1998 | Hutchins | ............... | F01P 7/16 123/41.05 |
| 5,975,031 A * | 11/1999 | Bartolazzi | ............... | F01P 7/164 123/41.02 |
| 8,646,417 B2 * | 2/2014 | Watanabe | ............... | F01P 7/14 123/41.08 |
| 8,707,927 B2 | 4/2014 | Hazelton | | |
| 2002/0195067 A1 * | 12/2002 | Murakami | ............... | F01P 3/20 123/41.1 |
| 2003/0136357 A1 * | 7/2003 | Kobayashi | ............... | F01P 7/167 123/41.08 |
| 2004/0169090 A1 * | 9/2004 | Kawasaki | ............... | F01P 5/10 236/101 R |
| 2004/0216700 A1 * | 11/2004 | Hutchins | ............... | B60H 1/00314 123/41.08 |
| 2004/0237912 A1 * | 12/2004 | Pawellek | ............... | F01P 5/10 123/41.44 |
| 2006/0005789 A1 * | 1/2006 | Miura | ............... | F01P 7/16 123/41.1 |
| 2006/0213460 A1 * | 9/2006 | Aoki | ............... | B60H 1/00885 123/41.05 |
| 2010/0122670 A1 * | 5/2010 | Lee | ............... | F01P 7/14 123/41.1 |
| 2010/0288213 A1 * | 11/2010 | Terada | ............... | F01P 7/16 123/41.08 |
| 2011/0120396 A1 * | 5/2011 | Myers | ............... | F01P 11/08 123/41.08 |
| 2011/0126783 A1 * | 6/2011 | Hwang | ............... | F01N 5/02 123/41.1 |
| 2012/0168118 A1 * | 7/2012 | Myers | ............... | F01P 5/10 165/51 |
| 2014/0224891 A1 * | 8/2014 | Matsusaka | ............... | F01P 7/14 236/34.5 |
| 2015/0053777 A1 * | 2/2015 | Iwasaki | ............... | F01P 7/165 236/34.5 |
| 2015/0107919 A1 * | 4/2015 | Hutchins | ............... | B60K 6/48 180/65.25 |
| 2015/0144078 A1 * | 5/2015 | Hutchins | ............... | F01P 7/165 123/41.1 |
| 2015/0267603 A1 * | 9/2015 | Ichihara | ............... | F01P 11/16 236/34.5 |
| 2018/0073421 A1 * | 3/2018 | Hutchins | ............... | F01P 7/167 |
| 2018/0274431 A1 * | 9/2018 | Tauschel | ............... | F01P 7/167 |
| 2019/0345868 A1 * | 11/2019 | Bauer | ............... | F01P 5/12 |

FOREIGN PATENT DOCUMENTS

| | | |
|---|---|---|
| DE | 195 39 604 A1 | 4/1997 |
| DE | 100 23 519 A1 | 1/2002 |
| DE | 10 2012 212 597 A1 | 1/2013 |
| EP | 0 864 733 A1 | 9/1998 |
| EP | 0 953 773 A1 | 11/1999 |
| EP | 2 607 643 A1 | 6/2013 |
| EP | 2 876 274 A1 | 5/2015 |
| WO | 0004283 A1 | 1/2000 |
| WO | 2005 012 705 A1 | 2/2005 |

OTHER PUBLICATIONS

English abstract for DE-100 23 519.
English abstract for DE-195 39 604.
English abstract for EP-2 876 274.

* cited by examiner

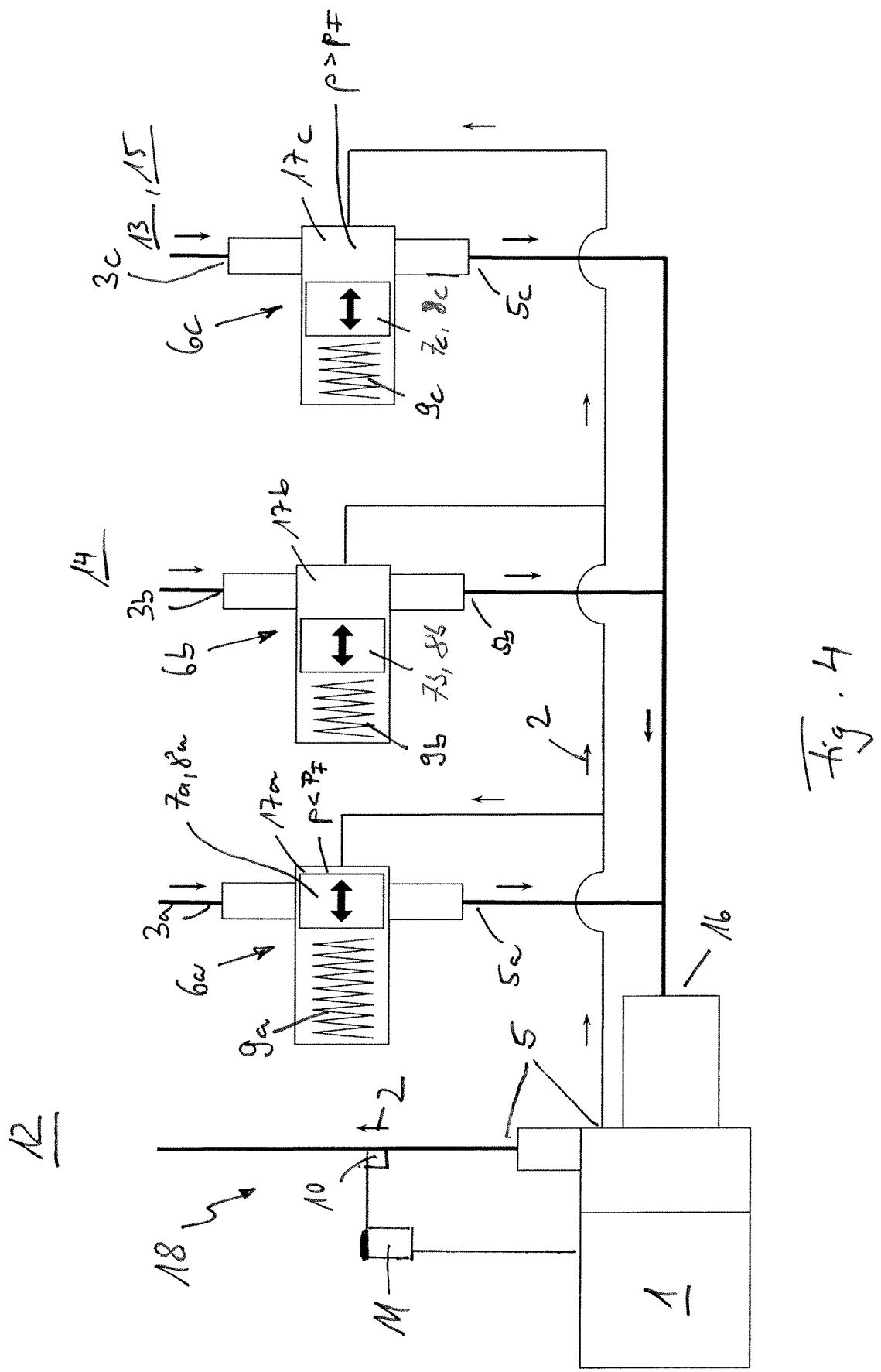

MOTOR VEHICLE

CROSS-REFERENCE TO RELATED APPLICATIONS

This application claims priority to International Patent Application No. PCT/EP2017/077012 filed on Oct. 23, 2017, to German Patent Application No. DE 10 2017 200 878.4 filed on Jan. 19, 2017, and to German Patent Application No. DE 10 2016 222 307.0 filed on Nov. 14, 2016, the contents of each of which are hereby incorporated by reference in their entirety.

TECHNICAL FIELD

The present invention relates to a motor vehicle having an internal combustion engine and a coolant pump.

BACKGROUND

In modern motor vehicles, a coolant pump is usually used for cooling an internal combustion engine, wherein the cooling power is usually controlled via a thermostat valve. Such a thermostat valve can open a bypass circumventing the radiator, for example when only a low cooling power is required. Such a thermostat valve often possesses an expansion element which enables comparatively simple, but also sluggish temperature-dependent control.

However, the motor vehicles known from the prior art and their coolant pumps are disadvantageous in that these usually run at constantly high power and are controlled exclusively via a thermostat valve. A comparatively high amount of energy is thus needed to operate the coolant pump.

The present invention is therefore concerned with the problem of providing an improved or at least an alternative embodiment for a motor vehicle, which, in particular, overcomes the disadvantages known from the prior art.

SUMMARY

According to the invention, this problem is solved by the subject mater of the independent claim(s). Advantageous embodiments are the subject matter of the dependent claim(s).

The present invention is based on the general idea of no longer operating a coolant pump in a motor vehicle expensively under a constantly high load and therefore with a comparatively high amount of energy, but instead providing a plurality of power stages for the coolant pump in the manner of operating points and moreover providing a valve device arranged separately from the coolant pump, which is controlled at the intake side and by pressure and controls a coolant flow depending on the selected operating point of the coolant pump. The electric coolant pump serves in a known manner for delivering a coolant, for example in the cooling circuit of an internal combustion engine of the motor vehicle, and is adjustable between a plurality of operating points. The motor vehicle according to the invention has an internal combustion engine, a radiator, a heat exchanger, the coolant pump and the valve device arranged separately therefrom and having at least one first coolant inlet, at least one second coolant inlet and a coolant outlet, which is connected to an inlet of the coolant pump, wherein the valve device is formed such that, depending on the selected operating point of the coolant pump and therefore the pressure p in the coolant, it opens or closes at least one first or second coolant inlet or simultaneously opens at least one first and second coolant inlet, wherein the first coolant inlet of the valve device and the coolant outlet of the coolant pump are connected to the internal combustion engine, whilst a second coolant inlet of the valve device is connected to the radiator. Such a motor vehicle according to the invention requires considerably less electrical energy to operate the coolant pump than was hitherto the case in constantly running coolant pumps. However, not only can electrical energy be saved thereby, but also fuel. The arrangement of the valve device separately from the coolant pump can also enable decentralized placement of the valve device, which is favorable in terms of installation space, in particular in installation spaces which could hitherto not be exploited for this purpose. The pressure-dependent control of the valve device also enables rapid switching thereof.

In a further advantageous embodiment of the solution according to the invention, in the first operating point, the coolant pump is switched off and at least one first coolant inlet of the valve device, which is controlled at the intake side and by pressure, is opened. In this case, the first operating point of the coolant pump is therefore synonymous with an off state. In this case, the first operating point is used in particular during a cold-start phase of the internal combustion engine, in which additional cooling of the internal combustion engine is not desired. A second operating point provides a delivery power and represents a comfort mode, for example, in which only an average cooling power of the internal combustion engine is required, which can also be achieved, for example, via a heat exchanger of an air-conditioning system of a motor vehicle. The third operating point of the cooling pump is represented by a cooling mode, in which the valve device is set such that the coolant flow circulates both via the radiator and via the heat exchanger and the internal combustion engine. In a fourth operating mode, a coolant flow takes place exclusively via the radiator, whereby intensified cooling is possible. By selecting the operating points, the amount of energy to be used for this is considerably lower than in a coolant pump running constantly under full load, in which, during a cold-start phase, for example, the coolant flow is simply conducted past the radiator by a valve formed as a bypass valve.

The valve device expediently has a valve body which, in the first and second operating point, assumes a first position, in which it blocks at least one second coolant inlet and uncovers at least one first coolant inlet. In this case, the second coolant inlet is connected to the radiator of the motor vehicle, whilst the first coolant inlet is connected, for example, to the heat exchanger of an air-conditioning system of the motor vehicle. In the first position of the valve body, in which only an average cooling power is required, the coolant flow is therefore not conducted via a radiator of the motor vehicle. In a third operating state, the valve body can also assume a second position, in which it partially opens the first and second coolant inlet. In this case, it can be provided that, in the fourth operating point, the valve body assumes a third position, in which it blocks at least one first coolant inlet and uncovers at least one second coolant inlet. In the fourth operating point of the coolant pump, and therefore in the third position of the valve body, this therefore brings about a coolant flow which circulates via a vehicle radiator and the internal combustion engine. In this case, the valve body assumes the third position solely as a result of the increased coolant pressure $p_3$ in the fourth operating point.

In a further advantageous embodiment of the solution according to the invention, a spring device is provided, which prestresses the valve body in its first position. To adjust the valve body between its first and second position, the coolant pressure must therefore increase, which is usually only achieved if the coolant pump is adjusted from its second operating point to its third operating point. In this case, the coolant pressure $p_2$, $p_3$ counteracts the pressure $P_F$ applied by the spring device.

A temperature sensor and a control device communicatively connected thereto are expediently provided for controlling the operating points and therefore the power of the coolant pump depending on the temperature of the coolant. To enable the respective operating point of the coolant pump to be selected, it is necessary to determine a cooling requirement, which is possible via the temperature sensor provided according to the invention and the control device communicatively connected thereto according to the invention. Below a particular coolant temperature, for example during a cold-start phase of the internal combustion engine, cooling of the coolant and therefore cooling of the internal combustion engine are not desired, so that, in this case, the control device adjusts the coolant pump to its first operating point, i.e. switches it off or leaves it switched off, for example. If the temperature of the coolant increases, the control device can detect this via the temperature sensor and, according to a characteristic map, for example, adjusts the coolant pump to its second operating point, in which an average cooling power is achieved. If the load on the internal combustion engine increases significantly, for example when driving uphill, the temperature of the coolant also increases, whereupon the control device adjusts the coolant pump to its third operating point, in which the coolant flow flows both via the radiator and via the heat exchanger. In the fourth operating point, the coolant flow flows exclusively via the radiator, whereby a further increased cooling power for cooling the internal combustion engine is achieved. Therefore, a temperature-dependent control of the operating points of the coolant pump is also possible via the temperature sensor and the control device communicatively connected thereto.

Further important features and advantages of the invention are revealed in the subclaims, in the drawings and in the associated description of the figures with reference to the drawings.

Of course, the features mentioned above and those still to be explained below can be applied not only in the combination described in each case but also in other combinations or in isolation, without deviating from the scope of the present invention.

Preferred exemplary embodiments of the invention are illustrated in the drawings and will be explained in more detail in the description below, wherein identical reference signs relate to identical or similar or functionally identical components.

BRIEF DESCRIPTION OF THE DRAWINGS

The drawings show, in each case schematically:

FIG. 4 shows a motor vehicle having a cooling system and a coolant pump with three valve units.

DETAILED DESCRIPTION

Figure 1:
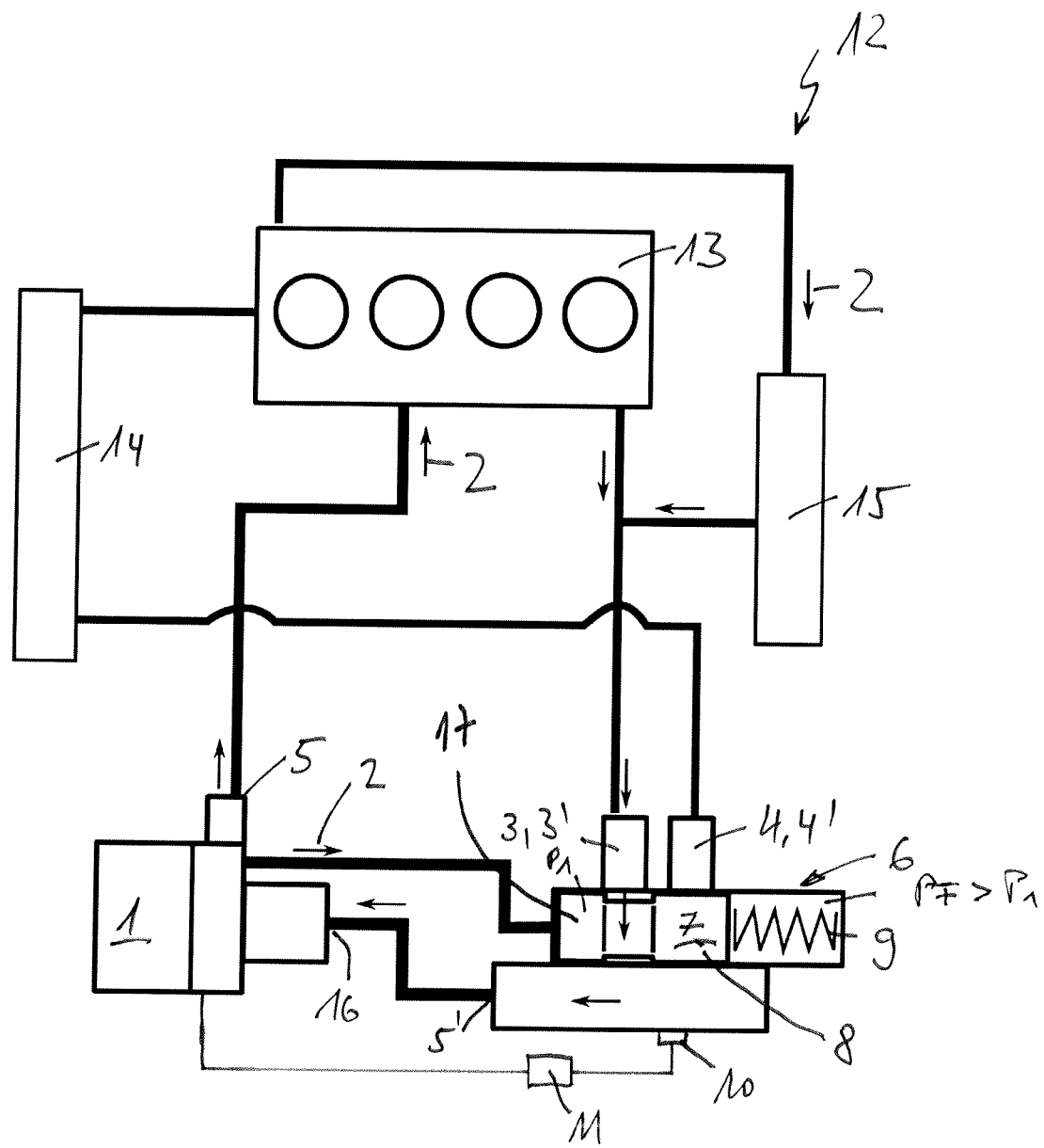
FIG. 1 shows a motor vehicle according to the invention, having an internal combustion engine, a coolant pump and a partially sectional valve device in the first or second operating point.
Figure 2:
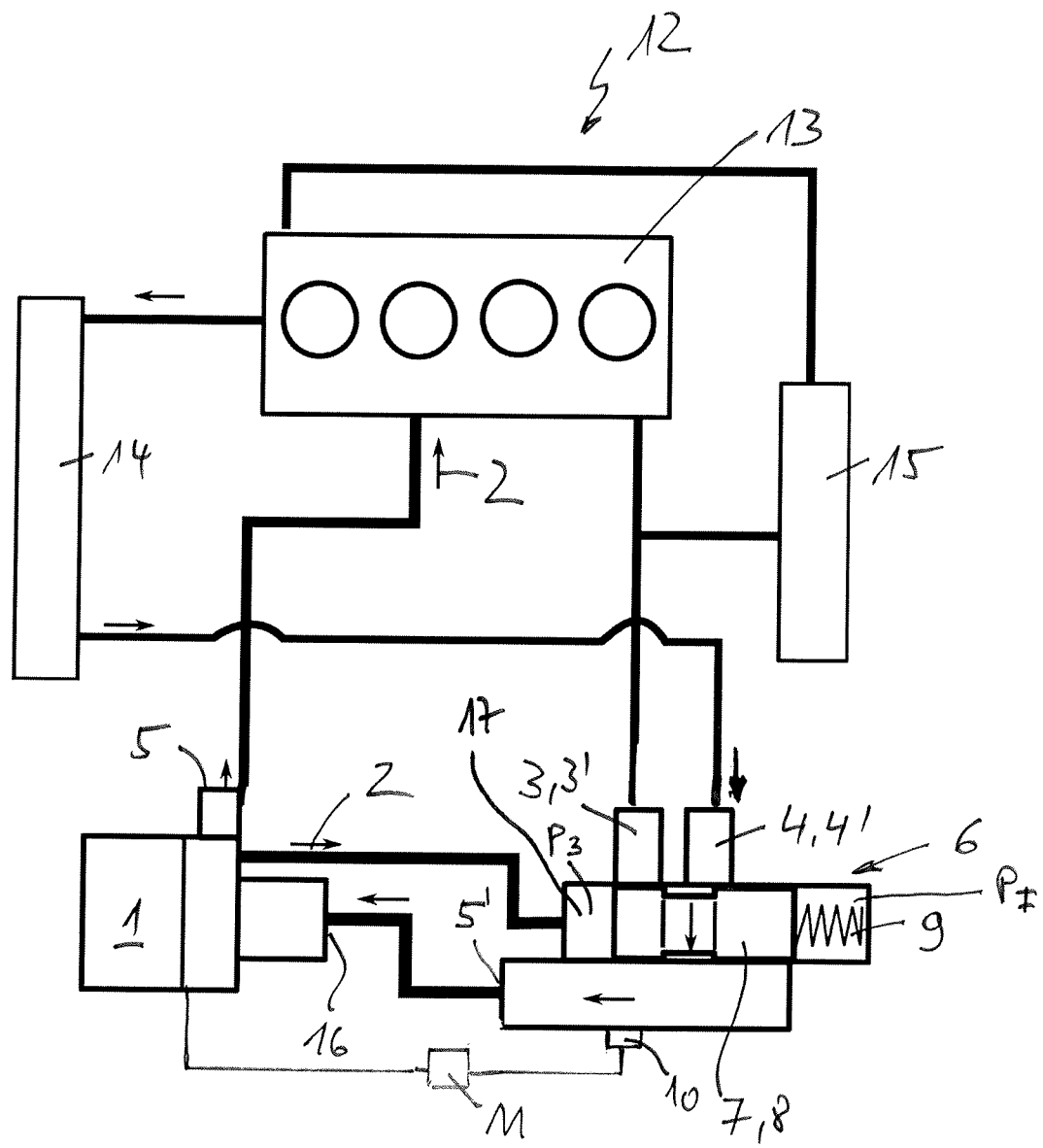
FIG. 2 shows an illustration as in FIG. 1, but with the coolant pump located in the fourth operating point.
Figure 3:
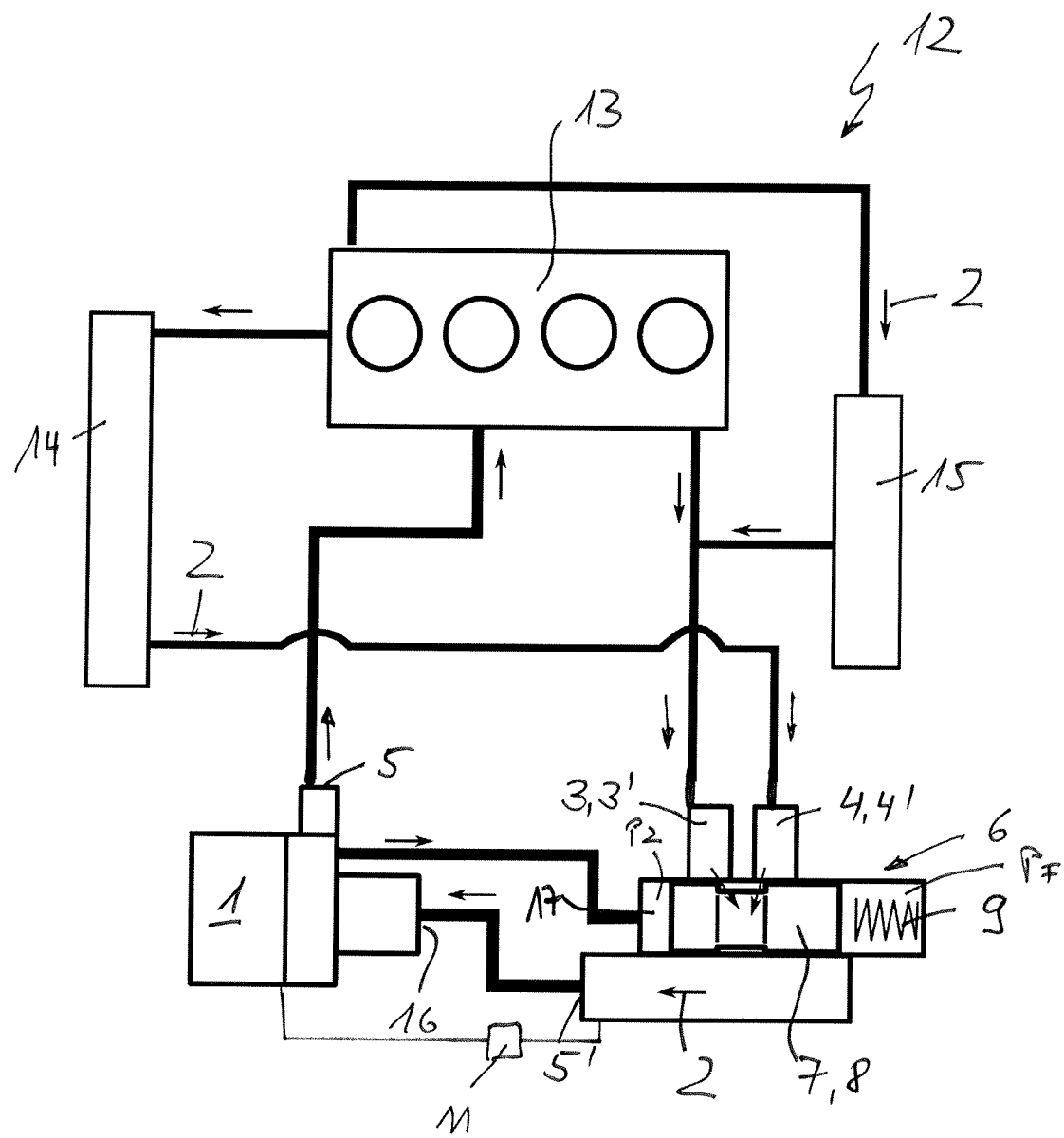
FIG. 3 shows an illustration as in FIG. 1, but with the coolant pump located in the third operating point.

According to FIGS. 1 to 3, a motor vehicle 12 according to the invention has an internal combustion engine 13, a radiator 14, a heat exchanger 15 of an air-conditioning system which is not otherwise shown and a coolant pump 1. The electric coolant pump 1 is formed for delivering a coolant 2. Likewise provided is a valve device 6 arranged separately from the coolant pump 1, which is controlled at the intake side and by pressure and has at least one first coolant inlet 3, 3', at least one second coolant inlet 4, 4' and a coolant outlet 5, which is connected to an inlet 16 of the coolant pump 1. In this case, controlled at the intake side and by pressure should be understood to mean that, at the valve device 6, the coolant inlets 3, 3', 4, 4' can be opened/closed by means of a valve body 7 which is adjustable depending on the pressure.

In this case, the coolant pump 1 is adjustable between a plurality of operating points, in particular between a first, a second, a third and a fourth operating point. The valve device 6 is formed such that, depending on the selected operating point of the coolant pump 1 and therefore the coolant pressure p, it opens or closes the at least one first or second coolant inlet 3, 3', 4, 4' or simultaneously opens at least one first and second coolant inlet 3, 3', 4, 4', wherein the first coolant inlet 3, 3' of the valve device 6 and a coolant outlet 5 of the coolant pump 1 are connected to the internal combustion engine 13, whilst a second coolant inlet 4, 4' of the valve device 6 is connected to the radiator 14.

As can be seen in FIGS. 1 to 3, the valve device 6 is arranged separately from the coolant pump 1, whereby a decentralized separation of the two components 1, 6, which is optimized in terms of installation space, can also take place.

In the first operating point, the coolant pump 1 is switched off and at least one first coolant inlet 3, 3' is opened (c.f. FIG. 1 without a flow of coolant 2). Therefore, a pressure p generated by the coolant pump 1 does not prevail in the coolant 2.

In the second operating point, the coolant pump 1 generates a pressure $p_1$ in the coolant 2, at which at least one first coolant inlet 3, 3' is opened and at least one second coolant inlet 4, 4' is closed (c.f. FIG. 1 with a flow of coolant 2), whilst, in a third operating point, the coolant pump 1 generates a pressure $p_2$ in the coolant 2, at which at least one first coolant inlet 3, 3' and at least one second coolant inlet 4, 4' are opened (c.f. FIG. 3). In a fourth operating point, the coolant pump 1 generates a pressure $p_3$ in the coolant 2, at which at least one first coolant inlet 3, 3' is closed and at least one second coolant inlet 4, 4' is opened (c.f. FIG. 2). In this case, the coolant pump 1 is connected to a pressure chamber 17 of the valve device 6 at its coolant outlet 5.

With regard to the construction of the valve device 6 which is controlled at the intake side and by pressure, reference is made below to FIGS. 1 to 3, from which it can be seen that the valve device 6 possesses a valve body 7 which, in this case, is formed as an adjustable valve piston 8 and which, in the first and second operating point, assumes a first position (c.f. FIG. 1), in which it blocks at least one second coolant inlet 4, 4' and uncovers at least one first coolant inlet 3, 3'. In the third operating point, on the other hand, the valve body 7 assumes a second position, in which it uncovers at least one first coolant inlet 3, 3' and at least one second coolant inlet 4, 4' (c.f. FIG. 3). In the fourth operating point, the valve body 7 assumes a third position, in which it blocks at least one first coolant inlet 3, 3' and uncovers a second coolant inlet 4, 4' (c.f. FIG. 2). Moreover, a spring device 9, for example a simple helical spring, is provided, which prestresses the valve body 7 in its first position, in which at least one second coolant inlet 4, 4' is blocked. In this case, the spring device 9 exerts a force on the valve body 7 which, in relation to the surface thereof, corresponds to a pressure $p_F$. In this case, the coolant outlet 5 of the coolant pump 1 is connected to the valve device 6 and prestresses the valve body 7 in opposition to the spring device 9. A temperature sensor 10 and a control device 11 communicatively connected thereto can likewise be provided for controlling the operating points of the coolant pump 1 depending on the temperature of the coolant 2. In this case, the valve device 6 is continuously adjustable depending on the rotational speed of the coolant pump 1. In this case, it is, of course, also alternatively conceivable that, instead of the valve body 7 formed as a valve piston 8, the valve device 6 according to the invention can also have other valve bodies 7, so that the valve device 6 can also be formed as a ball valve or as a disk valve, for example.

Cooling of the internal combustion engine 13 is not required or desired upon a cold start thereof in order to accelerate the heating of the internal combustion engine 13 and therefore achieve a more rapid lowering of emissions. During this cold-start phase, the coolant pump 1 is located in its first operating point, in which it does not bring about a build-up of pressure and does not deliver coolant 2 and is therefore switched off. If the temperature of the coolant 2 increases, this is detected via the temperature sensor 10, for example, which, in the present case according to FIG. 1, is arranged in the region of the valve device 6, but can, of course, additionally or alternatively also be positioned at another point in the coolant system. If the temperature of the coolant 2 reaches a certain value, the control device 11 connected to the temperature sensor 10 adjusts the coolant pump 1 to its second operating point, in which at least the pressure $p_1$ generated by the delivery power of the coolant pump 1 is at a level such that at least one second coolant inlet 4, 4' is still closed and a coolant flow 2 circulates exclusively via the internal combustion engine 13 and, for example, the heat exchanger 15 of the air-conditioning system of the motor vehicle 12. Also, in this case, only moderate cooling of the internal combustion engine 13 is required in this second operating point. The pressure $p_2$ of the coolant 2 generated in the second operating point is lower than the pressure $p_F$ acting on the valve body 7 by means of the spring device 9, so that the spring device 9 prestresses the valve body 7 in its first position in opposition to the coolant pressure $p_1$.

If the temperature of the coolant 2 increases further, this is likewise detected by the temperature sensor 10 and, upon reaching a further limit value, results in the control device 11 adjusting the coolant pump 1 to its third operating point, in which both the delivery power of the coolant pump 1 and also the pressure $p_2$ generated thereby in the coolant 2 increase. This results in the coolant pressure $p_2$ being greater than the pressure $p_F$ applied by the spring device 9 so that, in the third operating point, the valve body 7 is adjusted to the right according to FIG. 3, compresses the spring device 9 and simultaneously uncovers at least one second coolant inlet 4, 4', whereby the coolant flow 2 now circulates via the internal combustion engine 13, the radiator 14 and the heat exchanger 15 and via the coolant pump 1 back to the internal combustion engine 13. Therefore, some of the coolant flow 2 still flows via the heat exchanger 15.

If the temperature of the coolant 2 increases further, this is likewise detected by the temperature sensor 10 and, upon reaching a further limit value, results in the control device 11 adjusting the coolant pump 1 to its fourth operating point, in which both the delivery power of the coolant pump 1 and also the pressure $p_3$ generated thereby in the coolant 2 increase. This results in the coolant pressure $p_3$ being reached and being greater than the pressure $p_F$ applied by the spring device 9 so that, in the fourth operating point, the valve body 7 is adjusted to the right according to FIG. 2, compresses the spring device 9 and simultaneously closes at least one first coolant inlet 3, 3', whereby the coolant flow 2 now circulates via the internal combustion engine 13 and the radiator 14 and via the coolant pump 1 back to the internal combustion engine 13.

According to FIG. 4, a motor vehicle 12 has a cooling system 18 and a coolant pump 1. The, in particular electric, coolant pump 1 is formed for delivering a coolant 2. Likewise provided are valve devices 6a, 6b and 6c which are arranged separately from the coolant pump 1 and each have a coolant inlet 3a, 3b, 3c and a coolant outlet 5a, 5b, 5c, which are connected to an inlet 16 of the coolant pump 1.

In this case, the coolant pump 1 is adjustable between a plurality of operating points, in particular between a first, a second, a third and a fourth operating point. The valve devices 6a, 6b, 6c are formed such that they open, partially open or close depending on the selected operating point of the coolant pump 1 and therefore the coolant pressure p. In this case, the individual coolant inlets 3a, 3b, 3c are connected to individual assemblies, for example a heat exchanger 15 of an air-conditioning system or a radiator 14. As can be seen in FIG. 4, the valve devices 6a, 6b and 6c are arranged separately from the coolant pump 1 and at the intake side thereof, whereby a decentralized separation of the components 1, 6a, 6b and 6c, which is optimized in terms of installation space, can take place. Of course, further valve devices, which are not shown, can also be provided and controlled depending on the pressure.

In the first operating point, the coolant pump 1 is switched off and all valve devices 6a, 6b, 6c are closed. Therefore, a pressure p generated by the coolant pump 1 does not prevail in the cooling system 18.

In the second operating point, the coolant pump 1 generates a pressure $p_1$ in the coolant 2, at which at least one valve device 6c, and therefore its coolant inlet 3c, are opened and at least one further valve device 6a, 6b and its coolant inlet 3a, 3b are closed, whilst, in a third operating point, the coolant pump 1 generates a pressure $p_2$ in the coolant 2, at which at least two valve devices 6b, 6c, and therefore their coolant inlets 3b, 3c, are opened and at least one further valve device 6a and its coolant inlet 3a are closed. This is illustrated in FIG. 4. In a fourth operating point, the coolant pump 1 generates a pressure $p_3$ in the coolant 2/cooling system 18, at which all valve devices 6a, 6b, 6c, and therefore their coolant inlets 3a, 3b, 3c, are opened. In this case, the coolant pump 1 is connected to a respective pressure chamber 17a, 17b, 17c of the associated valve devices 6a, 6b, 6c at its coolant outlet 5.

With regard to the construction of the valve device 6, reference is made below to FIG. 4, from which it can be seen that the valve devices 6a, 6b, 6c each possess a valve body 7a, 7b, 7c which are formed as adjustable valve pistons 8a, 8b, 8c. Moreover, a spring device 9a, 9b, 9c, for example a helical spring, is provided in each case, which prestresses the associated valve body 7a, 7b, 7c in its first position, in which the respective coolant inlet 3a, 3b, 3c is in turn blocked.

In the first and second operating point, the valve body 7a, 7b, 7c assumes a first position (c.f. the valve body 7a), in which the associated coolant inlet 3a, 3b, 3c is blocked. In the third operating point, on the other hand, the valve body 7a, 7b, 7c assumes a second position, in which it uncovers the associated coolant inlet 3a, 3b, 3c (c.f. valve body 7b, 7c). In this case, the spring device 9a, 9b, 9c exerts a force on the associated valve body 7a, 7b, 7c which, in relation to the surface thereof, corresponds to a pressure $p_F$. In this case, the coolant outlet 5 of the coolant pump 1 is connected to the respective pressure chamber 17a, 17b, 17c of the associated valve devices 6a, 6b, 6c and, depending on the pressure, prestresses the valve body 7a, 7b, 7c in opposition to the spring device 9a, 9b, 9c. In this case, the individual spring devices 9a, 9b, 9c have an individual spring strength, whereby, at the same coolant pressure p, the one valve device 6b, 6c is already opened whilst the other valve device 6a still remains closed. In this case, the valve devices 6a, 6b, 6c are continuously adjustable depending on the rotational speed of the coolant pump 1.

For example, cooling of the internal combustion engine 13 is not required or desired upon a cold start thereof in order to accelerate the heating of the internal combustion engine 13 and therefore achieve a more rapid lowering of emissions. During this cold-start phase, the coolant pump 1 is located in its first operating point, in which it does not bring about a build-up of pressure and does not deliver coolant 2 and is therefore switched off. If the temperature of the coolant 2 increases, this is detected via the temperature sensor 10, for example, can be positioned at virtually any point in the coolant system 18, in particular also at the internal combustion engine 13. If the temperature of the coolant 2 reaches a certain value, the control device 11 connected to the temperature sensor 10 adjusts the coolant pump 1 to its second operating point, in which the pressure $p_1$ generated by the delivery power of the coolant pump 1 is at a level such that at least one valve device 6c opens if its spring strength is the lowest, whilst the valve devices 6b and 6a are still closed and a coolant flow 2 circulates exclusively via the internal combustion engine 13 and, for example, the heat exchanger 15 of the air-conditioning system of the motor vehicle 12. In this second operating point, a moderate cooling of the internal combustion engine 13 is required. The pressure $p_2$ of the coolant 2 which is generated in the second operating point is lower than the pressure $p_F$ acting on the valve body 7a, 7b by means of the spring device 9a, 9b, so that the spring device 9a, 9b prestresses the valve body 7a, 7b in its first position in opposition to the coolant pressure p.

If the temperature of the coolant 2 increases further, this is likewise detected by the temperature sensor 10 and, upon reaching a further limit value, results in the control device 11 adjusting the coolant pump 1 to its third operating point, in which both the delivery power of the coolant pump 1 and also the pressure $p_2$ generated thereby in the coolant 2 increase. This results in the coolant pressure $p_2$ being greater than the pressure $p_F$ applied by the spring device 9b so that, in the third operating point, the valve body 7b compresses the spring device 9b and simultaneously uncovers the associated coolant inlet 3b, whereby the coolant flow 2 now circulates via the internal combustion engine 13, the radiator 14 and the heat exchanger 15 and via the coolant pump 1 back to the internal combustion engine 13. Therefore, some of the coolant flow 2 still flows via the heat exchanger 15.

If the temperature of the coolant 2 increases further, this is likewise detected by the temperature sensor 10 and, upon reaching a further limit value, results in the control device 11 adjusting the coolant pump 1 to its fourth operating point, in which both the delivery power of the coolant pump 1 and the pressure $p_3$ generated thereby in the coolant 2 increase. This results in the coolant pressure $p_3$ being reached and being greater than the pressure $p_F$ applied by the spring devices 9a, 9b, 9c, so that all of the valve devices 6a, 6b, 6c open in the fourth operating point.

The invention claimed is:

1. A motor vehicle, comprising an internal combustion engine, a radiator, a heat exchanger, a coolant pump, and a valve device arranged separately therefrom, which is controlled at an intake side by pressure;
   the valve device including at least one first coolant inlet, at least one second coolant inlet, and a coolant outlet connected to an inlet of the coolant pump;
   wherein the valve device is configured to, based on a selected operating point of the coolant pump and a pressure in a coolant, at least one of open and close at least one of the at least one first coolant inlet and the at least one second coolant inlet;
   wherein the at least one first coolant inlet and a coolant outlet of the coolant pump are connected to the internal combustion engine;
   wherein the at least one second coolant inlet is connected to the radiator; and
   wherein, in a first operating point of the coolant pump, the coolant pump has a first rotational speed of a plurality of rotational speeds at which the at least one first coolant inlet is closed and the at least one second coolant inlet is open.

2. The motor vehicle as claimed in claim 1, wherein, in a second operating point of the coolant pump, the coolant pump is switched off and the at least one first coolant inlet is open.

3. The motor vehicle as claimed in claim 2, wherein:
   in a third operating point of the coolant pump, the coolant pump has a second rotational speed of the plurality of rotational speeds at which the at least one first coolant inlet is open and the at least one second coolant inlet is closed;
   in a fourth operating point of the coolant pump, the coolant pump has a second third rotational speed of the plurality of rotational speeds at which the at least one first coolant inlet and the at least one second coolant inlet are open.

4. The motor vehicle as claimed in claim 3, wherein the valve device has a valve body, and wherein at least one of:
   in the third operating point, the valve body is arranged in a first position, in which the valve body blocks the at least one second coolant inlet and uncovers the at least one first coolant inlet;
   in the fourth operating point, the valve body is arranged in a second position, in which the valve body uncovers the at least one first coolant inlet and the at least one second coolant inlet; and
   in the first operating point, the valve body is arranged in a third position, in which the valve body blocks the at least one first coolant inlet and uncovers the at least one second coolant inlet.

5. The motor vehicle as claimed in claim 4, wherein the valve body is structured as a valve piston and is adjustable in a translatory manner.

6. The motor vehicle as claimed in claim 3, further comprising a spring device, wherein:
   the valve device has a valve body;
   in the third operating point, the valve body is arranged in a first position, in which
   the valve body blocks the at least one second coolant inlet and uncovers the at least one first coolant inlet; and
   the spring device prestresses the valve body in the first position.

7. The motor vehicle as claimed in claim 6, wherein the coolant outlet
of the coolant pump is connected to the valve device and prestresses the valve body in opposition to the spring device.

8. The motor vehicle as claimed in claim 1, wherein the valve device is continuously adjustable based on the rotational speed of the coolant pump.

9. The motor vehicle as claimed in claim 1, further comprising a
temperature sensor and a control device communicatively connected thereto configured to control a power of the coolant pump based on a temperature of the coolant.

10. The motor vehicle as claimed in claim 1, wherein:
the valve device includes a first valve body, a second valve body, a first spring device, and a second spring device;
the first valve body is adjustable into (i) a first position where the first valve body blocks the at least one first coolant inlet such that the at least one first coolant inlet is closed and (ii) a second position where the first valve body uncovers the at least one first coolant inlet such that the at least one first coolant inlet is open;
the second valve body is adjustable into (i) a first position where the second valve body blocks the at least one second coolant inlet such that the at least one second coolant inlet is closed and (ii) a second position where the second valve body uncovers the at least one second coolant inlet such that the at least one second coolant inlet is open; and
the first spring device prestress the first valve body in the first position and the second spring device prestress the second valve body in the first position.

11. The motor vehicle as claimed in claim 10, wherein:
the first spring device prestresses the first valve body in the first position via a first spring force;
the second spring device prestresses the second valve body in the first position via a second spring force; and
the first spring force and the second spring force are different from one another.

12. A motor vehicle, comprising an internal combustion engine, a radiator, a heat exchanger, a coolant pump, and a valve device arranged separately therefrom, which is controlled at an intake side by pressure;
the valve device including a plurality of first coolant inlets, a plurality of second coolant inlets, and a coolant outlet connected to an inlet of the coolant pump;
wherein the valve device is configured to, based on a selected operating point of the coolant pump and a pressure in a coolant, at least one of open and close at least one of i) at least one of the plurality of first coolant inlets and ii) at least one of the plurality of second coolant inlets;
wherein the plurality of first coolant inlets and a coolant outlet of the coolant pump are connected to the internal combustion engine;
wherein at least one of the plurality of second coolant inlets is connected to the radiator and at least one of the plurality of second coolant inlets is connected to the heat exchanger;
wherein at least two of the plurality of second coolant inlets are configured to open at different operating points of the coolant pump and at different pressures in the coolant; and
wherein, in a first operating point of the coolant pump, the coolant pump has a first rotational speed of a plurality of rotational speeds at which at least one of the plurality of first coolant inlets is closed and at least one of the plurality of second coolant inlets is open.

13. The motor vehicle as claimed in claim 12, wherein, in a second operating point of the coolant pump, the coolant pump is switched off and at least one of the plurality of first coolant inlets is open.

14. The motor vehicle as claimed in claim 13, wherein:
in a third operating point of the coolant pump, the coolant pump has a second rotational speed of the plurality of rotational speeds at which at least one of the plurality of first coolant inlets is open and at least one of the plurality of second coolant inlets is closed; and
in a fourth operating point of the coolant pump, the coolant pump has a third rotational speed of the plurality of rotational speeds at which at least one of the plurality of first coolant inlets and at least one of the plurality of second coolant inlets are open.

15. The motor vehicle as claimed in claim 14, wherein the valve device has a valve body, and wherein at least one of:
in the third operating point, the valve body is arranged in a first position, in which the valve body blocks at least one of the plurality of second coolant inlets and uncovers at least one of the plurality of first coolant inlets;
in the fourth operating point, the valve body is arranged in a second position, in which the valve body uncovers at least one of the plurality of first coolant inlets and at least one of the plurality of second coolant inlets; and
in the first operating point, the valve body is arranged in a third position, in which the valve body blocks at least one of the plurality of first coolant inlets and uncovers at least one of the plurality of second coolant inlets.

16. The motor vehicle as claimed in claim 14, further comprising a spring device, wherein:
the valve device has a valve body;
in the third operating point, the valve body is arranged in a first position, in which the valve body blocks at least one of the plurality of second coolant inlets and uncovers at least one of the plurality of first coolant inlets; and
the spring device prestresses the valve body in the first position.

17. The motor vehicle as claimed in claim 16, wherein the coolant outlet of the coolant pump is connected to the valve device and prestresses the valve body in opposition to the spring device.

18. The motor vehicle as claimed in claim 12, wherein the valve device is continuously adjustable based on the rotational speed of the coolant pump.

19. The motor vehicle as claimed in claim 12, further comprising a temperature sensor and a control device communicatively connected thereto configured to control a power of the coolant pump based on a temperature of the coolant.

20. A motor vehicle, comprising an internal combustion engine, a radiator, a heat exchanger, a coolant pump, and a valve device arranged separately therefrom, which is controlled at an intake side by pressure;
the valve device including at least one first coolant inlet, at least one second coolant inlet, and a coolant outlet connected to an inlet of the coolant pump;
wherein the valve device is configured to, based on a selected operating point of the coolant pump and a pressure in a coolant, at least one of open and close at least one of the at least one first coolant inlet and the at least one second coolant inlet;
wherein the at least one first coolant inlet and a coolant outlet of the coolant pump are connected to the internal combustion engine, and the at least one second coolant inlet is connected to the radiator;

wherein the valve device is continuously adjustable based on a rotational speed of the coolant pump;

wherein a power of the coolant pump is controlled based on a temperature of the coolant via a temperature sensor and a control device communicatively connected thereto;

wherein, in a first operating point of the coolant pump, the coolant pump is switched off and the at least one first coolant inlet is open;

wherein, in a second operating point of the coolant pump, the coolant pump has a rotational speed at which the at least one first coolant inlet is open and the at least one second coolant inlet is closed;

wherein, in a third operating point of the coolant pump, the coolant pump has a second rotational speed at which the at least one first coolant inlet and the at least one second coolant inlet are open; and wherein, in a fourth operating point of the coolant pump, the coolant pump has a third rotational speed at which the at least one first coolant inlet is closed and the at least one second coolant inlet is open.

* * * * *